United States Patent Office 2,868,739
Patented Jan. 13, 1959

2,868,739

PROCESS FOR PRODUCING CELLULAR POLYURETHANE RESINS

Günther Nischk and Wilhelm Bunge, Leverkusen, and Otto Bayer, Leverkusen-Bayerwerk, Germany, assignors to Farbenfabriken Bayer Aktiengesellschaft, Leverkusen, Germany, a corporation of Germany No Drawing. Application March 24, 1954
Serial No. 418,476

Claims priority, application Germany March 26, 1953

2 Claims. (Cl. 260—2.5)

The present invention relates to new porous materials of low density and to a process of producing these materials.

It is known to produce porous materials of low density from diisocyanates and compounds containing at least two replaceable hydrogen atoms in the molecule. The compounds employed in the reaction with the diisocyanates are substantially polyesters containing hydroxyl groups and free carboxyl groups which result from the dicarboxylic acids used in the preparation of the polyesters. These carboxyl groups react with the isocyanate groups to form amide groups with evolution of carbon dioxide; this reaction, which proceeds parallel with the formation of urethanes from the hydroxy groups and diisocyanates, yields the quantity of gas desired for the formation of foamed products. The foamed products thus obtained contain, apart from polyester groups, a preponderant amount of urethane groups and amide groups in quantities equivalent to the acid number of the polyester. If a polyester of lower unit weight is to be produced, i. e. if an increased rate of production of gas is desired, the process by which the polyesters are produced must be interrupted at a higher acid number and at a lower viscosity. For economic and technical reasons the acid number has an upper limit, since a higher acid number results in an increase in the number of the hydroxyl groups, which necessitates an increased proportion of the more valuable diisocyanate, and since the proportion of polyurethane to polyamide formed with evolution of carbon dioxide is modified by the decreased viscosity of the mixture of polyester and isocyanate to such an extent that a substantial part of the quantity of carbon dioxide evolved is wasted.

Low density materials can also be produced from diisocyanates and neutral polyesters with the complementary use of water whereupon urea bridges are formed besides polyurethane groups. In this case, the reaction yielding carbon dioxide requires twice the quantity of isocyanate groups as compared with the above reaction of carboxyl groups with isocyanates.

We have now found that new and valuable low density materials of the most varied unit weights can be obtained by subjecting polyesters containing only free carboxyl end groups to the reaction with diisocyanates.

Accordingly the present invention provides a process for the production of porous materials of low density which comprises reacting one or more polyesters, which have been prepared from polyhydroxy compounds and polycarboxylic acids and contain only free carboxyl end groups, with one or more diisocyanates.

The products obtained according to the invention differ from the porous materials previously obtained from polyisocyanates in that the bridges linking the polyester units consist, almost exclusively, of carbamide groups and that substantially smaller quantities isocyanate are needed to obtain products of equal properties. Polyesters with a high content of free carboxyl end groups have not been available so far. A process for their production is described in copending application Ser. No. 278,508, filed by Günther Nischk, Karl E. Müller and Otto Bayer. According to this copending application these polyesters are obtainable by reacting almost neutral polyesters containing hydroxyl groups with dicarboxylic anhydrides, preferably at temperatures substantially below those used in the usual esterification reactions. In this reaction also anhydrides or saturated dicarboxylic acids may be employed. Instead of anhydrides, the dicarboxylic acids themselves may be used if the reaction is carried out under carefully controlled conditions of temperature and polyesters with a moderately high molecular weight are used.

Polyesters containing hydroxyl groups can be prepared in known manner by reacting polyalcohols with polycarboxylic acids. In this reaction the alcohol component is to be employed in excess. It is, of course, possible to incorporate into these esters other components, for instance higher fatty acids hydroxyamines and diamines, by condensation.

The diisocyanates employed in the process of the invention may belong to the aliphatic, hydroaromatic, aromatic or heterocyclic series. Preferably, diisocyanates showing a good solubility in the polyesters containing carboxyl groups and a low melting point are employed. Compounds capable of reacting as diisocyanates by splitting up diisocyanates in the heat may be employed instead of the free diisocyanates; suitable compounds are addition products of diisocyanates, for instance those obtained with malonic ester, and phenyl urethanes thereof.

The reaction of the components is generally promoted by the use of elevated temperature and can further be accelerated by the presence of catalysts, for instance tertiary bases of the most varied nature, and by soluble heavy metal compounds. The tertiary bases which are active catalysts, may also be present in the polyester itself if for instance N-methyldiethanolamine or N-methyltriethanolamine is employed as a polyalcohol during esterification.

The process of the invention further allows the complementary use of plasticizers and fillers.

The following examples further illustrate the process of the invention, the parts given being by weight:

*Example 1*

298 parts of a polyester containing 5.7% of hydroxyl groups and having the acid number 1.2, which has been prepared by vacuum esterification of 3 mols of adipic acid with 2 mols of butylene glycol and 2 mols of hexanetriol, are reacted with 98 parts of maleic anhydride at 120° C. After heating to 110–120° C. for 3 hours the polyester has the acid number 146 and a hydroxyl content of less than 1%.

100 parts of this polyester, which contains substantially only free carboxyl groups, are intimately mixed with 18 parts of toluenediisocyanate and cast into molds after adding 2 parts of hexahydrodimethylaniline. A foamed product of good homogeneity and good mechanical properties is obtained after a short time.

If the maleic anhydride used in the production of the polyester containing carboxyl groups is replaced by the equivalent quantity of maleic acid and the reaction carried out in vacuum at 110–120° C., a low density material with equal mechanical properties is obtained after the reaction with toluenediisocyanate. The complementary use of benzoyl peroxide causes additional cross-linking.

*Example 2*

298 parts of the polyester containing 5.7% of hydroxyl groups, which is described in Example 1, are reacted with 100 parts of succinic anhydride and kept at 100–150° C. for 10 hours. 100 parts of the polyester thus obtained, which has an acid number of 143, are intimately mixed with 3 parts of hexahydrodimethylaniline and thereafter with 22 parts of toluenediisocyanate.

After standing for a short time, preferably at elevated temperature, a foamed product of low unit weight and good mechanical properties is obtained.

*Example 3*

298 parts of the polyester containing 5.7% of hydroxyl groups, which is described in Example 1, are reacted with 100 parts of succinic anhydride and kept at 100–150° C. for 10 hours. 100 parts of the polyester thus obtained, which has an acid number of 143, are intimately mixed with 3 parts of hexahydrodimethylaniline and thereafter with 46 parts of toluene diphenylurethane. The mixture is cast into previously heated molds and heated to 170–180° C. in the drying chamber. A product of low unit weight is thus obtained with properties similar to the product obtained according to Example 2.

We claim:
1. A process for the production of a porous product of low density which comprises reacting an organic diisocyanate with a polyester, the reactive groups of which are predominantly terminal carboxyl groups, said polyester being prepared by condensing (a) a hydroxyl-group-containing polyester having an acid number of not more than about 2.5 and prepared by the esterification of a polycarboxylic acid with a monomeric polyhydric alcohol, and (b) a member of the group consisting of dicarboxylic acids and anhydrides thereof.

2. Process of claim 1 wherein hydroxyl-group-containing polyester is prepared by condensation of at least one aliphatic dicarboxylic acid with at least one aliphatic polyhydric alcohol.

References Cited in the file of this patent

UNITED STATES PATENTS

| | | |
|---|---|---|
| 2,529,512 | Ott | Nov. 14, 1950 |
| 2,620,349 | Slocombe | Dec. 2, 1952 |
| 2,625,532 | Seeger | Jan. 13, 1953 |